June 21, 1966  G. NATTA ETAL  3,257,365
POLYMERS HAVING A STERICALLY ORDERED STRUCTURE OF
1-CYANO-1,3-BUTADIENE AND PROCESS
FOR PREPARING THEM
Filed Sept. 19, 1963
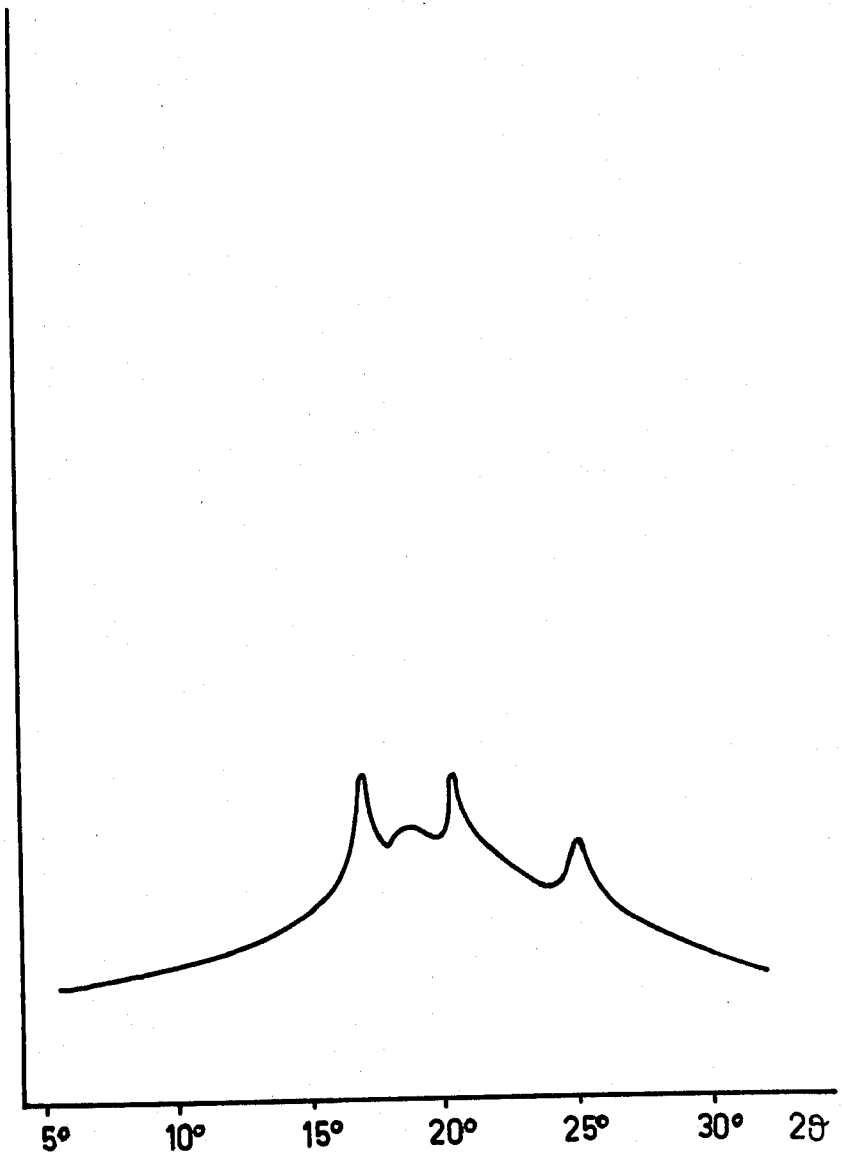
INVENTORS.
GIULIO NATTA, UMBERTO GIANNINI and ANTONIO CASSATA
BY

United States Patent Office 3,257,365
Patented June 21, 1966

3,257,365
POLYMERS HAVING A STERICALLY ORDERED STRUCTURE OF 1-CYANO-1,3-BUTADIENE AND PROCESS FOR PREPARING THEM
Giulio Natta, Umberto Giannini, and Antonio Cassata, Milan, Italy, assignors to Montecatini Societa Generale per l'Industria Mineraria e Chimica, Milan, Italy
Filed Sept. 19, 1963, Ser. No. 309,963
Claims priority, application Italy, Sept. 20, 1962, 18,499/62
11 Claims. (Cl. 260—88.7)

This invention relates to high molecular weight linear homopolymers having a sterically ordered structure of 1-cyano-1,3-butadiene and to a process for preparing them.

The polymers of 1-cyano-1,3-butadiene known until now, and obtained either by anionic polymerization or by radicalic polymerization, have a disordered structure and are insoluble, infusible, highly colored, resinous products having very poor mechanical characteristics. The possibility of practical use for these polymers has therefore been very limited.

It has now been found according to the present invention that, by operating in the presence of particular catalytic systems, it is possible to obtain, with high yields, substantially linear high polymers of 1-cyano-1,3-butadiene, having a sterically ordered structure and substantially consisting of monomeric units with trans 1,4-enchainment.

The catalysts that can be used in the preparation of these polymers consist of metallorganic compounds having the general formula $$MeR_aX_b$$

in which Me is an alkaline metal or a metal of Group II of the Mendeleeff Periodic Table, R is an alkyl or aryl group, X is a halogen, $a$ can be 1 or 2, $b$ can be 0 or 1 and is always zero when Me is an alkaline metal, and $a+b$ is the valence of Me.

Among the catalysts belonging to the above class we may mention e.g. ethyl lithium, butyl lithium, amyl lithium, amyl sodium, octyl potassium, octyl sodium, magnesium diethyl, magnesium phenylbromide, magnesium dibutyl, magnesium phenylchloride, and magnesium diphenyl.

It has been found that in practice the most active and stereo-specific catalysts, namely those giving polymerization products prevailingly or substantially consisting of monomeric units polymerized with trans 1,4-enchainment, are the alkaline metal derivatives.

The catalyst amounts needed for promoting the polymerization are in general small. In practice it has been found that the best results, as regards the conversion of monomer to polymer, are obtained by using monomer/catalyst molar ratios comprised between 20:1 and 100:1.

In order to favor the regular course of the polymerization it is convenient to operate in the presence of inert diluent media which do not react with the catalyst. More particularly, aliphatic, cycloaliphatic or aromatic hydrocarbons such as e.g., n-heptane, cyclohexane, benzene, toluene, xylenes or mixtures thereof can be used as the reaction medium.

The polymerization temperature is generally comprised between $-100°$ and $+50°$ C., and preferably between $-20°$ and $-80°$ C.

By carrying out the polymerization under these conditions high yields are obtained and high conversion of monomer to polymer are reached within a few hours.

At the end of the polymerization the polymer obtained can be purified from the catalyst by treatment with alcohols, e.g., methanol.

As known there are two stereoisomeric forms of 1-cyano-1,3-butadiene; the cis form and the trans form which can be separated from each other by rectification.

It has now been found according to the present invention that by polymerizing trans 1-cyano-1,3-butadiene under the aforementioned conditions a solid polymer containing at least 90% of trans 1,4-structure is obtained. By X-rays examination this polymer appears to be completely amorphous.

The 1-4 enchainment of the polymer can be observed from the infrared absorption spectrum in which the characteristic band of the vinylic double bond is absent and it is deduced that 1-2 enchainments are therefore absent. The presence of a band at 4.46 microns, which is characteristic of the $C\equiv N$ bond non-conjugated with double bonds, can be observed in the absorption spectrum of the polymer, while the absorption spectrum of the monomer shows the presence of a band at 4.51 microns, which is characteristic of a $C\equiv N$ bond conjugated with a double bond. The presence of a band at 10.30 microns, attributed to trans double bonds, is also noted in the absorption spectrum of the polymer.

If instead of trans-1-cyano-1,3-butadiene, the cis isomer is polymerized under the above specified conditions, a polymer is obtained which has a substantially (namely at least for 90% trans-1-4 structure and is crystalline by X-rays examination. The Geiger registration of the diffraction spectrum (CuKα) of this crystalline polymer is represented in the accompanying FIGURE 1.

The infrared spectrum of this polymer presents characteristics similar to those of the spectrum of the homopolymer of the trans isomer.

Polymerization runs have also been carried out in which, instead of the pure cis and trans isomers, mixtures of both isomers have been polymerized. Depending on the different cis/trans ratio used, polymers having prevailingly trans 1,4-enchainment have been obtained which appear to be crystalline or amorphous.

The results of these polymerization runs are reported in Table 1.

TABLE 1

| Run | Cis/trans ratio | Characteristics of the product |
|---|---|---|
| 1 | 90/10 | Crystalline. |
| 2 | 70/30 | Do. |
| 3 | 60/40 | Traces of crystallinity. |
| 4 | 50/50 | Amorphous. |
| 5 | 40/60 | Do. |

The crystalline polymers of cis-1-cyano-1,3-butadiene obtained according to the present invention are insoluble, even at the boiling point, in most of organic solvents such as e.g., in aliphatic, cycloaliphatic and aromatic hydrocarbons, chlorinated hydrocarbons, alcohols, ethers, esters and carbon disulphide. They are however soluble in ketones and dimethylformamide and are swollen by tetra hydrofurane and dioxane.

The amorphous polymers of trans 1-cyano-1,3-butadiene have solubility characteristics similar to those of the crystalline polymers.

Of particular interest from the point of view of utility is the fact that the crystalline polymers of the cis isomer can be easily molded to give shaped articles. Films that are stretchable and fibers that appear to be oriented by X-rays examination can also be obtained from solutions of the polymers by conventional methods.

The following examples are given to better illustrate the invention without intending in any way to limit its scope.

*Example 1*

15 cc. of anhydrous toluene and 0.88 g. of cis 1-cyano-1,3-butadiene are introduced, under nitrogen, into a 50-cc. three necked flask provided with a stirrer and a dropping funnel. This solution is cooled to —78° C. and another solution of 0.83 millimols of butyl lithium in 5 cc. of toluene is slowly added dropwise while agitating. A few minutes after the addition of the catalyst an increase in the viscosity of the solution is noted. After 5 hours, during which the temperature has been kept at —78° C., the catalyst is decomposed and the polymer is precipitated with methanol. After filtration, washing wish methanol and vacuum drying, 0.8 g. of a white solid which appears to be crystalline by X-rays examination is obtained.

The infrared absorption spectrum of the polymer shows the presence of an essentially trans 1,4-structure (90% of monomeric units polymerized with trans 1,4-enchainment).

*Example 2*

A suspension of 0.52 millimols of octyl sodium in 17 cc. of n-heptane is introduced, under nitrogen, into a 50-cc. three necked flask provided with a stirrer and a dropping funnel. The catalyst suspension is cooled to —78° C. and a solution of 0.86 g. of cis-1-cyano-1,3-butadiene in 5 cc. of n-heptane is slowly added dropwise. After agitation for 4 hours, keeping the temperature at —78° C., the polymerization is stopped by the addition of methanol and 0.82 g. of a white polymer which appears to be crystalline by X-rays examination is isolated as described in Example 1.

The infrared absorption spectrum shows the presence of an essentially trans 1,4-structure (90% of monomeric units polymerized with a trans 1,4-enchainment).

*Example 3*

A solution of 0.86 g. of trans 1-cyano-1,3-butadiene in 15 cc. of n-heptane is introduced into a 50-cc. three-necked flask provided with stirrer and dropping funnel. To this solution, cooled to —78° C., another solution of 0.8 millimols of butyl lithium in 5 cc. of n-heptane is slowly added dropwise. After 5 hours, during which the temperature has been kept at —78° C., the polymerization is stopped by adding methanol and 0.8 g. of a polymer is isolated, which appears to be amorphous by X-rays examination and shows the presence of an essentially trans 1,4-structure in its infrared absorption spectrum.

*Example 4*

The procedure of Example 1 was repeated except that n-heptane was used as the polymerization solvent instead of toluene.

0.83 g. of polymer which appears to be crystalline by X-rays examination and consists substantially of monomeric units having trans 1,4-enchainment are obtained.

*Example 5*

Into a 100 cc. flask are introduced 2.5 g. of trans 1-cyano-1,3-butadiene and 40 cc. of toluene. To this solution, cooled to —78° C., is slowly added a suspension of 0.6 g. of $C_6H_5MgBr$ in 20 cc. of toluene. After 8 hours, during which the temperature has been kept at —78° C., the polymerization is stopped and 0.4 g. of polymer are isolated.

*Example 6*

Into a 100 cc. flask are introduced 0.12 g. of $$Mg(C_2H_5)_2$$

and 15 cc. of toluene. To this suspension, cooled to —78° C., is slowly added a solution of 1.7 g. of cis 1-cyano-1,3-butadiene in 5 cc. toluene. After 7 hours, during which the temperature has been kept at —78° C., the polymerization is stopped and 1.4 g. of polymer are isolated.

*Example 7*

Into a 100 cc. flask are introduced 0.4 g. of $$C_6H_5MgCl$$

and 20 cc. of toluene. To this suspension, cooled to —78° C., is slowly added a solution of 2 g. of an equimolecular mixture of cis and trans 1-cyano-1,3-butadiene in 10 cc. toluene. After 8 hours, during which the temperature has been kept at —78° C., the polymerization is stopped and 1.2 g. of an amorphous polymer are obtained.

What is claimed is:

1. High molecular weight, substantially linear homopolymers of 1-cyano-1,3-butadiene, in which at least 90% of the monomeric units are enchained with trans 1,4 structure.

2. High molecular weight, substantially linear crystalline homopolymer of cis-1-cyano-1,3-butadiene, in which at least 90% of the monomeric units are enchained with trans 1,4 structure, and having diffraction maxima at $2\theta$ equal to 16.8, 20.45, and 25.15 degrees.

3. High molecular weight, substantially linear amorphous homopolymers of trans 1-cyano-1,3-butadiene, in which at least 90% of the monomeric units are enchained with trans 1,4 structure.

4. A process for preparing high molecular weight, substantially linear homopolymers substantially consisting of monomeric units having trans 1,4 enchainment of 1-cyano-1,3-butadiene which comprises polymerizing 1-cyano-1,3-butadiene in the presence of an effective amount of a metallorganic compound as the catalyst characterized by the general formula:

$$MeR_aX_b$$

in which Me is a metal selected from the group consisting of alkali metals and metals of Group II of the Mendeleeff's Periodic Table, R is selected from the group consisting of alkyl and aryl, X is a halogen, $a$ is a whole number from 1 to 2, $b$ is selected from the group consisting of 0 and 1, and is zero when Me is an alkaline metal; $a+b$ is equal to the valence of Me.

5. A process according to claim 4, characterized in that the polymerization is carried out at a temperature ranging from about —100° to +50° C.

6. A process according to claim 4, characterized in that the polymerization is carried out at a temperature ranging from about —20° to —80° C.

7. A process according to claim 4, characterized in that the polymerization is carried out in the presence of an inert diluent selected from aliphatic, cycloaliphatic or aromatic hydrocarbons or mixtures thereof.

8. A process according to claim 4, characterized in that the molar ratio of the monomer to catalyst ranges between 20:1 and 100:1.

9. A process according to claim 4, wherein the 1-cyano-1,3-butadiene is trans 1-cyano-1,3-butadiene.

10. A process according to claim 4, wherein the 1-cyano-1,3-butadiene is cis 1-cyano-1,3-butadiene.

11. A process according to claim 4, wherein the 1-cyano-1,3-butadiene is a mixture of cis and trans 1-cyano-1,3-butadiene.

(References on following page)

References Cited by the Examiner

UNITED STATES PATENTS

| | | | |
|---|---|---|---|
| 2,608,555 | 8/1952 | Bullitt | 260—88.7 |
| 3,081,282 | 3/1963 | Mark | 260—88.7 |
| 3,087,919 | 4/1963 | Wilkinson | 260—88.7 |
| 3,100,761 | 8/1963 | Fellman et al. | 260—85.5 |

FOREIGN PATENTS 1,090,858   10/1960   Germany.

OTHER REFERENCES

Snyder et al.: JACS, 71 (1949), pp. 1055–6.
Beaman: JACS, 70 (1948), pp. 3115–8.
Gaylord et al.: Linear and Stereoregular Addition Polymers, Interscience, Publishers, Inc., New York (1959).

JOSEPH L. SCHOFER, *Primary Examiner.*

DONALD E. CZAJA, *Examiner.*

H. WONG, *Assistant Examiner.*